(12) United States Patent
Takei

(10) Patent No.: US 6,663,734 B2
(45) Date of Patent: Dec. 16, 2003

(54) METHOD FOR FORMING A FOAMED PRODUCT INTEGRAL WITH TRIM COVER ASSEMBLY

(75) Inventor: Yoshiyuki Takei, Akishima (JP)

(73) Assignee: Tachi-S Co., Ltd., Tokyo (JP)

(*) Notice: Subject to any disclaimer, the term of this patent is extended or adjusted under 35 U.S.C. 154(b) by 147 days.

(21) Appl. No.: 09/994,832

(22) Filed: Nov. 28, 2001

(65) Prior Publication Data

US 2003/0098113 A1 May 29, 2003

(51) Int. Cl.[7] .................. B32B 31/04; B32B 31/06; B32B 7/08
(52) U.S. Cl. ................. 156/79; 156/93; 156/291; 156/297; 156/247; 156/344; 29/91.1; 264/46.4; 264/46.6
(58) Field of Search ................ 156/78, 79, 291, 156/292, 93, 297, 344, 247; 29/91.1, 91.5; 264/46.4, 46.5, 46.6, 45.4, 271.1, 279, 212, 239, 241, 261, 259, 328.1, 328.16

(56) References Cited

U.S. PATENT DOCUMENTS 5,669,670 A  9/1997  Haraguchi et al.
5,687,662 A  11/1997  Kawasaki

*Primary Examiner*—Sam Chuan Yao
*Assistant Examiner*—Barbara J Musser
(74) *Attorney, Agent, or Firm*—Browdy and Neimark

(57) ABSTRACT

Method for forming a foamed product integral with trim cover assembly, in which, at first, a foam padding piece and a surface cover piece are temporarily secured or bonded with each other, at the local points thereof, to thereby provide a temporarily secured cover section unit. A plurality of such cover section units are sewn together to form a three-dimensional body of the trim cover assembly. A liquid foaming material is injected and cured in the inside of the sewn trim cover assembly, and subsequent thereto, the temporarily secured local points of each surface cover piece are removed from the corresponding local points of each foam padding piece, whereby a foamed product integral with the trim cover assembly is obtained, with both surface cover pieces and foam padding pieces being stretched uniformly therein.

7 Claims, 4 Drawing Sheets

METHOD FOR FORMING A FOAMED PRODUCT INTEGRAL WITH TRIM COVER ASSEMBLY

BACKGROUND OF INVENTION

1. Field of the Invention

The present invention relates to a method for subjecting a trim cover assembly to foaming by injecting and curing a liquid foaming material therein, to thereby form a foamed product integral with the trim cover assembly, such as a headrest or armrest for use with an automotive seat.

2. Description of Prior Art

Seats, headrests, armrests and other cushiony accessories for use in automobiles are basically formed from a trim cover assembly and a foam cushion member. In particular, a typical process for forming a relatively small article, such as headrest or armrest, involves a foaming step wherein a liquid foaming material is injected and cured in a three-dimensional trim cover assembly to create a foam cushion member filled therein, together with a framework and some fittings if required, so as to produce a resulting foamed product integral with the trim cover assembly (e.g. headrest or armrest). In most cases, the three-dimensional trim cover assembly used is preformed by sewing together plural separate cover sections, each comprising a top cover layer (or surface cover piece) and a thin foam layer (or slab foam wadding piece), into a predetermined three-dimensional or box-like configuration that conforms to an outer shape of a resulting product.

In this kind of trim cover assembly, a natural or artificial leather material is sometimes required as the top cover layer thereof. Typically, the natural leather material includes a bull leather, a horse leather or the like, and the artificial leather material includes a synthetic resin leather or the like. In that instance, conventionally, a piece of leather surface cover material, be it of a natural or artificial leather, is adhesively laminated at its reverse side to one piece of thin foam padding to create one cover section unit which forms a part of a resulting three-dimensional trim cover assembly. However, in this particular lamination process, an adhesive is applied to whole areas of both leather surface cover piece and foam padding piece to thereby provide a bonded cover section unit. Such bonded cover section unit will inevitably cause objectionable wrinkles and creases therein when it is bent and curved by a worker for sewing with another bonded cover section unit (s). Further, in most cases, a plurality of the thus-bonded cover section units are first set in a reversed state where the foam padding layers thereof are exposed outwardly, and then, they are sewn together to form a reversed state of three-dimensional trim cover assembly (generally conforming to an outer shape of headrest or armrest, for instance) wherein all the foam padding layers are exposed outwardly while the leather surface cover layers are situated in the interior of trim cover assembly. Then, such reversed trim cover assembly is turned over from an opening thereof into an normal state where all the leather surface cover layers are exposed outwardly. This reversing process further causes additional wrinkles and creases in the resultant trim cover assembly, which impairs the aesthetic appearance of leather surfaces thereof.

To solve the problem, instead of the foregoing full lamination, it has been proposed to effect a partial connection between the leather surface cover piece and foam padding piece. That is, the peripheral end regions of the leather surface cover piece are adhesively attached or sewn along and with the corresponding peripheral terminal ends of foam padding piece to form a partially joined cover section unit. But, when a plurality of such cover section units undergo the abovementioned bending and curving step while sewing them together and also undergo the reversing process for reversing the trim cover assembly into a normal state, the foam wadding layers are floated and waved from the leather surface layers, thus creating plural creased and bent areas in the foam wadding layers. Eventually, when subjecting the thus-formed trim cover assembly to a foaming process, there are a plurality of incompletely foamed spots at those creased and bent areas in the foam wadding layers.

SUMMARY OF THE INVENTION

In view of the above-stated drawbacks, it is therefore a primary purpose of the present invention to provide an improved method for forming a foamed product integral with trim cover assembly which insures to avoid creation of slack and crease in both of surface cover pieces and foam padding pieces of the trim cover assembly.

In order to attain such purpose, in accordance with the present invention, there is basically provided a method comprising the steps of:

forming a plurality of surface cover pieces in a predetermined shape, each having ends;

forming a plurality of foam padding pieces, each being generally equal in size to each of the plurality of surface cover pieces;

temporarily securing local points of each of the plurality of foam padding pieces to the respective local points of each of the plurality of surface cover pieces via a securing means, thereby providing a temporarily secured cover section unit;

providing a plurality of such temporarily secured cover section units;

thereafter, sewing together end portions of the plurality of the temporarily secured cover section units, thereby forming the trim cover assembly in a three-dimensional shape;

injecting a liquid foaming material into inside of the thus-formed trim cover assembly;

curing and expanding the liquid foaming material so as to create a foam cushion member filled in the trim cover assembly; and thereafter, removing the local points of each of the plurality of the cover surface pieces from the respective local points of each of the plurality of the foam padding pieces, overcoming a securing strength of said securing means;

whereby the foamed product integral with the trim cover assembly is formed, in which both surface cover pieces and foam padding pieces are stretched uniformly.

Accordingly, due to such scattered temporarily secured points, there is no restrained relation between the surface cover piece and the foam padding piece all through the assembly processes, which insures to allow free relative stretching movement between the two layers by removing the local points therein after the foaming process, whereby any crease and slack is not caused in both of the layers in a resultant foamed product. Hence, the outer aesthetic appearance of the foamed product, such as a headrest or an armrest, is far improved. This is particularly effective in the case of the surface cover piece being a natural or artificial leather material.

Preferably, the aforementioned local points for temporarily securing may be defined adjacent to and along the end portions of each of the plurality of surface cover pieces and foam padding pieces, and the peripheral ends of the temporarily secured cover section unit may be sewn together along a line distant from said local points, prior to providing a plurality of said temporarily secured cover section units.

Other various features and advantages will become apparent from reading of the descriptions hereinafter, with reference to the annexed drawings.

DETAILED DESCRIPTION OF PREFERRED EMBODIMENT OF THE PRESENT INVENTION

At first, the generic purpose of the present invention is to provide a method for forming a foamed product integral with a trim cover assembly, as stated earlier. Thus, the term, "foamed product integral with trim cover assembly" is defined hereby to include various kinds of upholstered products formed under a foaming process comprising the steps of: providing a three-dimensional trim cover assembly; injecting a liquid foaming material into the inside of that trim cover assembly; and finally curing and expanding the liquid foaming material to create a foam padding filled in the trim cover assembly. By way of one example, in the herein-described embodiment, a headrest will be mainly described among such various kinds of foam products integral with trim cover assembly. Reference being now made to FIGS. 1 through 9, description will be made of one preferred exemplary method for forming a headrest (as designated by (HR) in FIG. 5), for instance, in accordance with the present invention.

Figure 1:
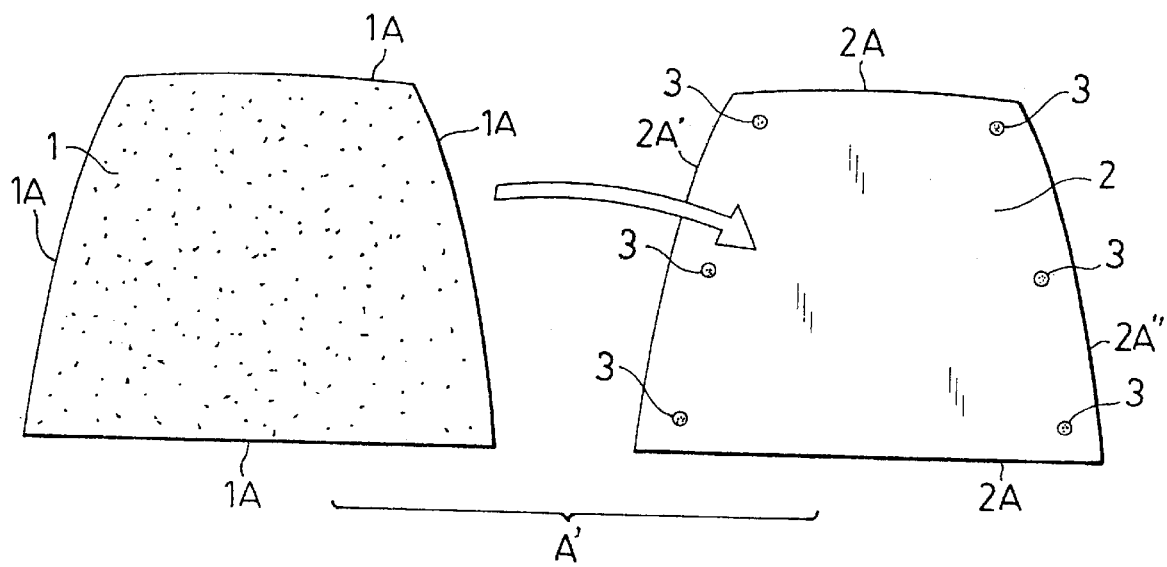
FIG. 1 is a schematic plan view showing the state where a foam padding piece is temporarily secured by adhesive agent to a leather surface piece in accordance with the method of the present invention.

As shown in FIG. 1, in accordance with the present invention, there are employed a surface cover piece (2) of a natural or artificial leather material and a thin foam wadding piece (1) formed from a slab urethane foam material, both of which constitute a basic material for forming a frontal cover section (A) of a resulting three-dimensional trim cover assembly (HC) (see FIG. 4) conforming to an outer shape of headrest. The leather material used for the surface cover piece (2) may include a bull leather, a horse leather, for instance, or artificial leather materials.

As can be seen from FIG. 1, the entire size of the surface cover piece (2) is equal to that of the foam wadding piece (1). In the illustrated embodiment, both whole shapes of the surface cover piece (2) and foam wadding piece (1) are substantially square, or strictly stated, of a generally trapezoidal contour, since they must be conformed as closely as possible to the particular trapezoidal configuration of frontal cover section (A) to be formed. This is however just an example and not imitative. The surface cover piece (2) has four edges (2A) whereas likewise the foam wadding piece (1) has four edges (1A).

FIG. 1 shows the first step of temporarily securing the foam padding piece (1) to the surface cover piece (2) to provide an initial cover section unit (A'). In the embodiment shown, as a means for serving such temporarily securing purpose, a small amount of adhesive agent (3) is applied to six local points on the reverse surface of the surface cover piece (2). More specifically, according to the illustrated mode, three equidistant bonding points are defined adjacent to and along one lateral edge (2A') of the surface cover piece (2) whereas likewise three equidistant bonding points are defined adjacent to and along another lateral edge (2A"). Of course, instead thereof, the adhesive agent (3) may be applied in the same manner to total six local points in the surface of the foam padding piece (1) to be bonded to the reverse surface of surface cover piece. Since the two pieces (1) (2) are temporarily secured or bonded together for subsequent removal of the bonded points which will be described later, the adhesive agent used may preferably be of a relatively low bonding strength, such as an aqueous adhesive agent, or any other suitable securing means may be used for that purpose, such as very small pieces of removable fasteners (e.g. small pieces of Velcro loop-and-hook-type fastening tapes).

Figure 2:
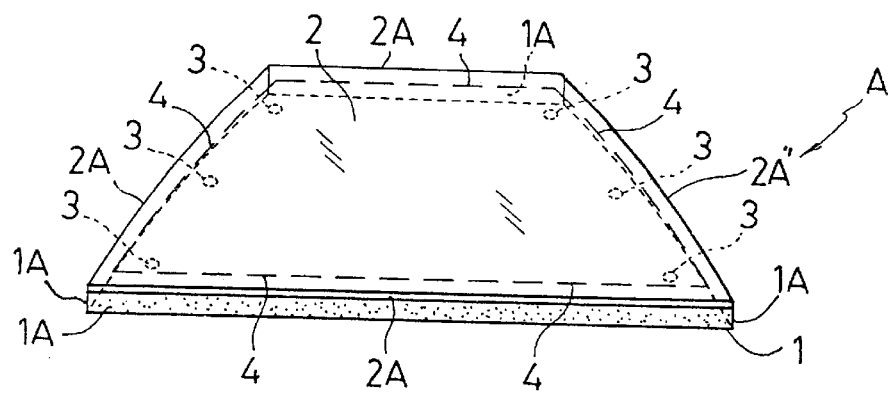
FIG. 2 is a schematic perspective view of a cover section formed by sewing the temporarily bonded peripheral ends of the foam padding piece and the leather surface piece in accordance with the method of the present invention.

After that application of adhesive agent (3), one surface of the foam wadding piece (1) is placed on the reverse surface of the surface cover piece (2) and temporarily bonded therewith via the six localized bonded points (at (3)), thus providing one initial cover section unit (A'), as in FIG. 1, Next, as can be seen from FIG. 2, sewing is performed to fixedly join the edge (1A) of foam padding piece (1) to and along the edge (2A) of surface cover piece (2) via a sewing thread (4). In this regard, care must be taken to insure that the swing is effected along the lines in proximity to the edges (1A) (2A) and a certain distance from the bonded points at (3). In that manner, all the four edges (1A) of foam padding piece (1) are respectively sewn with and along all the four edges (2A) of surface cover piece (2), whereupon there is produced a frontal cover section (A).

Figure 3:
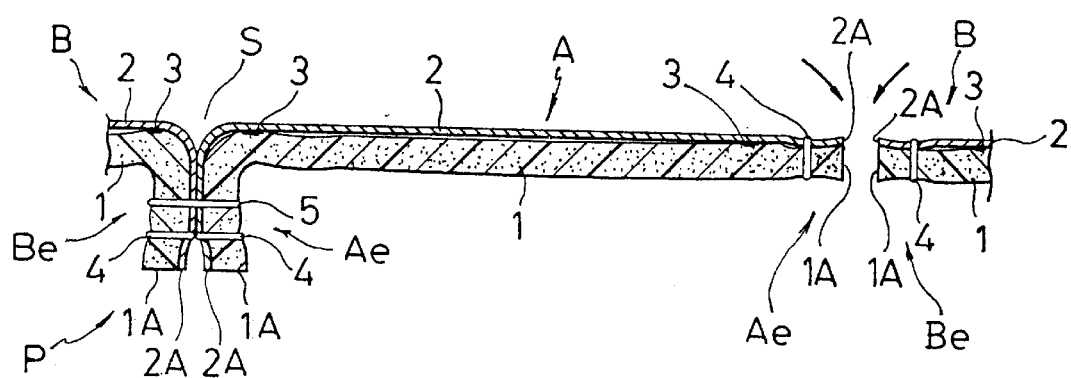
FIG. 3 is a partly broken sectional view showing the steps of bending the end portions of the cover section units and sewing the thus-bent end portions with one another.

Then, as indicated by the arrows in FIG. 3, all the sewn end portions (at 1A, 2A and 4) of frontal cover section (A) are bent downwardly (i.e. in a direction toward a side where the foam padding piece (1) lies) at substantially a right angle relative to a predetermined bending line. As a result, the cover section (A) is now formed with inwardly bent end portions (Ae) which serve as sewing end portions to be sewn with other cover sections as will be described later.

While not shown, the same procedures and conditions as described above are effected to form other cover sections than the frontal cover section (A), such as a pair of side cover sections (B) (B), a rear cover section (C) and a bottom cover section (D). That is, each of those cover sections (A, B, C and D) also comprises a leather surface piece (2) and a foam padding piece (1) and is subjected to substantially the same sewing and bending procedures as described above, creating bent end portions (as similar to the bent end portions (Ae)).

Figure 4:
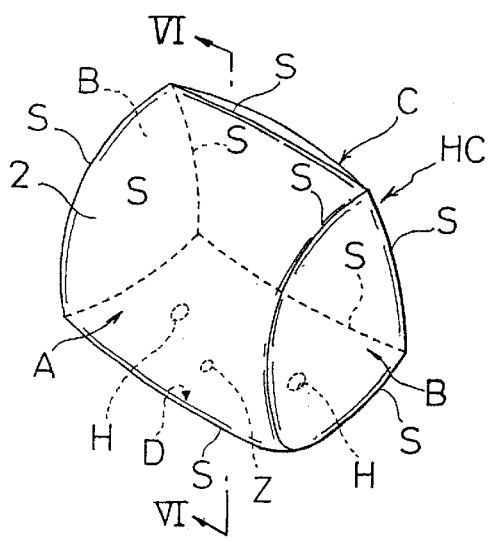
FIG. 4 is a schematic perspective view of a three-dimensional headrest trim cover assembly formed by the method of the present invention.

Then, for example, as shown in FIG. 3, two bent end portions (Ae) respectively of the two lateral sides of frontal cover section (A) are sewn by threads (5) with and along the corresponding bent end portions (Be) of each of the two side cover sections (B). Though not shown, likewise, other bent end portions (Ae) of the cover section (A) are sewn with the corresponding bent end portion of other remaining cover sections (C and D), so that a three-dimensional sewn body of trim cover assembly (HC) is formed as best seen in FIG. 4. In the FIG. 6, it is observed that all the bent end portions of cover sections (A) (C) (D) are sewn together to form projections (P) from the respective sewn junctures within the trim cover assembly, thereby tending to stretch each surface cover piece or layer (2) as shown, whereas on the other hand, each of the foam padding pieces or layers (1) is in the state of being slightly waved and floated from the surface cover layer (2), which is due to the localized point bonded areas at (3) preventing a uniform stretch of the foam padding layer (1) which is caused by a stretching force of the surface cover layer (2), Designations (H) and (Z), respectively, denote a pair of headrest stay holes and an injection hole. The two headrest stay holes (H) allow two headrest stays (6) (see FIG. 8) to pass therethrough, respectively, while the injection hole (Z) allows an injection nozzle (12) to be inserted therethrough into the interior of the trim cover assembly (HC).

Figure 7:
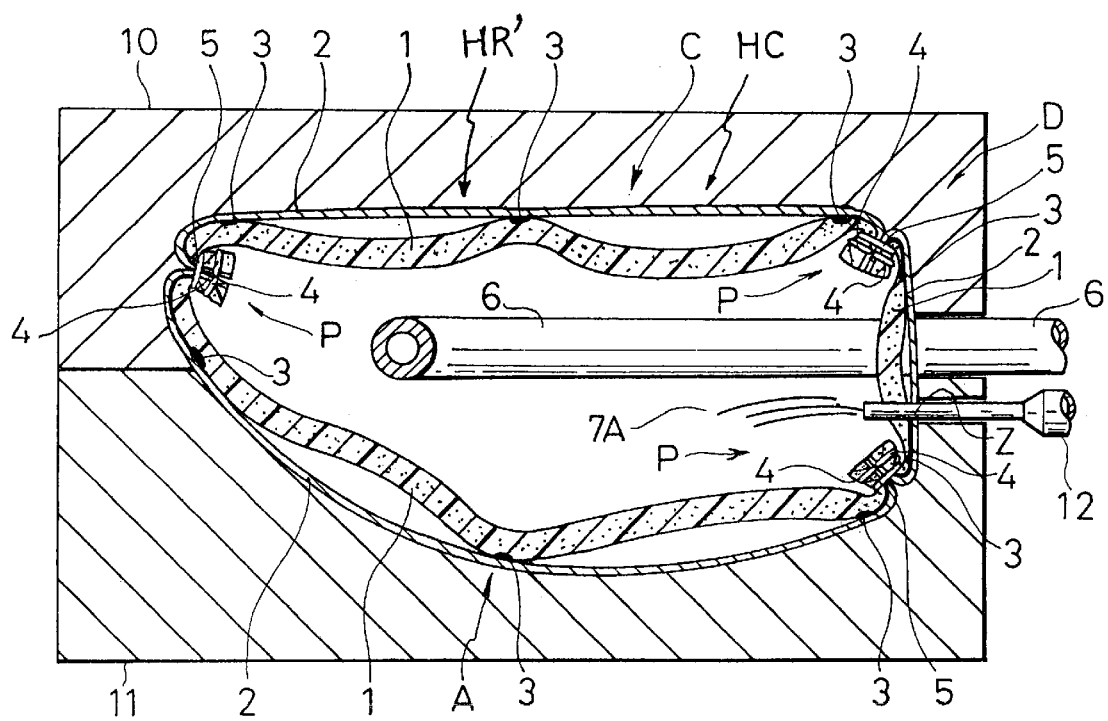
FIG. 7 is a partly broken sectional view showing a foaming process where the headrest trim cover assembly with headrest stays is placed between foaming upper and lower dies and a liquid foaming material is injected in the trim cover assembly.

The two headrest stays (6) are set in the trim cover assembly (HC), projecting through the respective two holes (H) to the outside, thereby producing an incomplete headrest unit as indicated by the designation (HR') in FIG. 7.

Next, referring to FIG. 7, the incomplete headrest unit (HR') is placed between upper and lower dies (10) (11), and thereafter, an injection nozzle (12) is inserted through the injection hole (Z) into the trim cover assembly (HC). A liquid base material (7A) is injected through the nozzle (12) into the inner hollow of trim cover assembly (HC). Then, foaming is effected to cure and expand the liquid base material (7A) within the trim cover assembly to create a foam cushion member (7) filled therein, as in FIG. 8, whereupon a complete headrest (HR) is produced. Even at this stage, as can be seen from FIG. 8, while being pushed by the expanded foam cushion member (7) outwardly, each foam padding piece or layer (2) remains in a slightly waved state and not in full contact with the surface cover piece or layer (1).

It is noted here that, while not shown, a suitable impermeable layer is laminated on the outer surface of each foam padding piece or layer (1) which faces inwardly of the trim cover assembly (HC) with a view to preventing impregnation of the liquid foaming material (7A) into the foam padding layer (1).

Thereafter, the resulting complete headrest (HR) with two stays (6) projecting outwardly therefrom is taken out from the upper and lower dies (10) (11).

Figure 8:
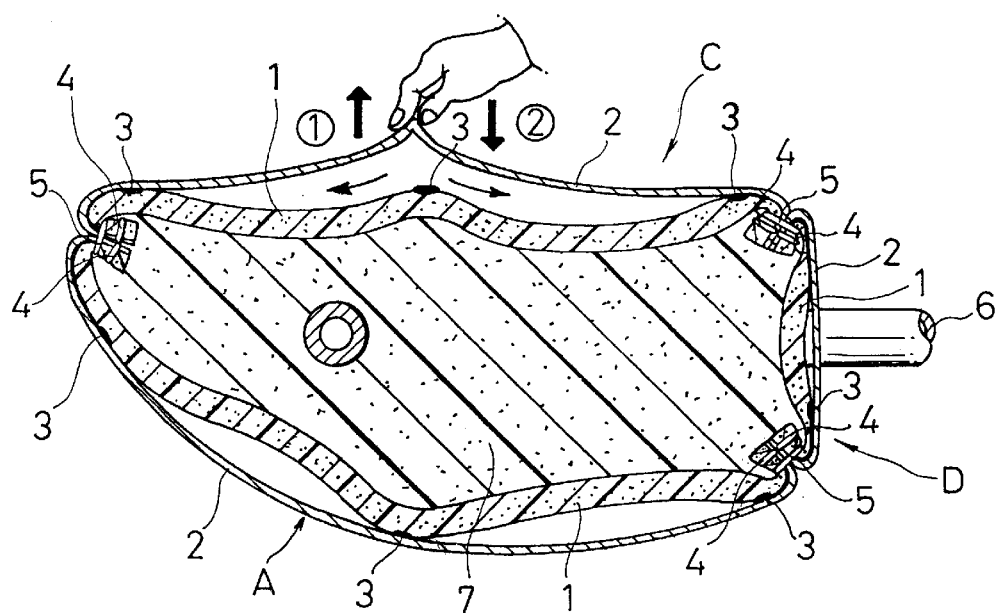
FIG. 8 is a section view which explanatorily shows the step of removing the temporarily secured local points of the surface cover piece from the corresponding local points of the foam padding piece.

With reference to FIG. 8, as indicated by the arrow ①, each of the temporarily bonded points (at 3) of the surface cover layer (2) is resiliently pulled outwardly by the fingers of worker and forcibly removed from the corresponding bonded point of the foam padding layer (1), overcoming the bonding strength of adhesive agent (3), so as to separate the surface cover layer (2) therefrom. As this moment, it is seen that, as indicated by the leftward and rightward arrows, the foam padding layer (1) is released from the state restrained by the adhesive (3) and tends to expand from the bonded point, with its elastic recovery property, into a neatly expanding state without such waved state as in FIG. 8, with the result that the foam padding layer (1) is stretched uniformly upon and along the whole outer surface of the foam cushion member (7) in a close contact therewith. Then, as indicated by the arrow ②, the worker releases the pulled point of the surface cover layer (2) from his or her hand, so that the surface cove layer (2) is resiliently contracted and tends to uniformly cover the outer surface of the thus-expanded foam padding layer (1). The same adhesive removing procedure in each of the temporarily bonded points at (3) between the surface cover layer (2) and foam padding layer (1) as in the above-described manner are also effected with regard to other cover sections than the frontal cover section (A), such as a pair of side cover sections (B) (B), a rear cover section (C) and a bottom cover section (D). It is noted that the adhesive removing procedure is not limited to such manual procedure conducted by the hand of worker, but may be effected in various other ways insofar as it serves the purpose of the present invention.

Figure 5:
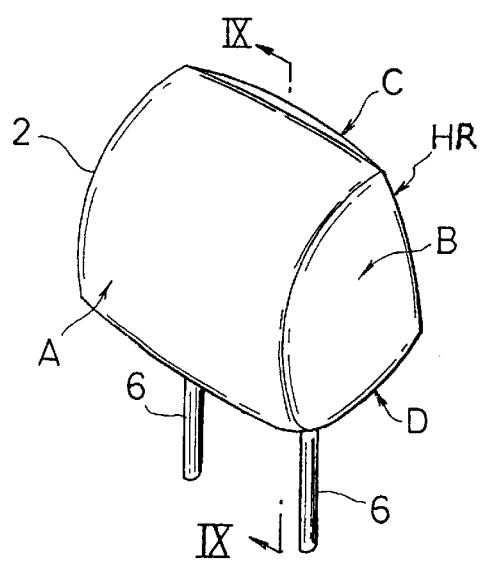
FIG. 5 is a schematic perspective view of a resulting headrest finally formed by the method of the present invention.
Figure 6:
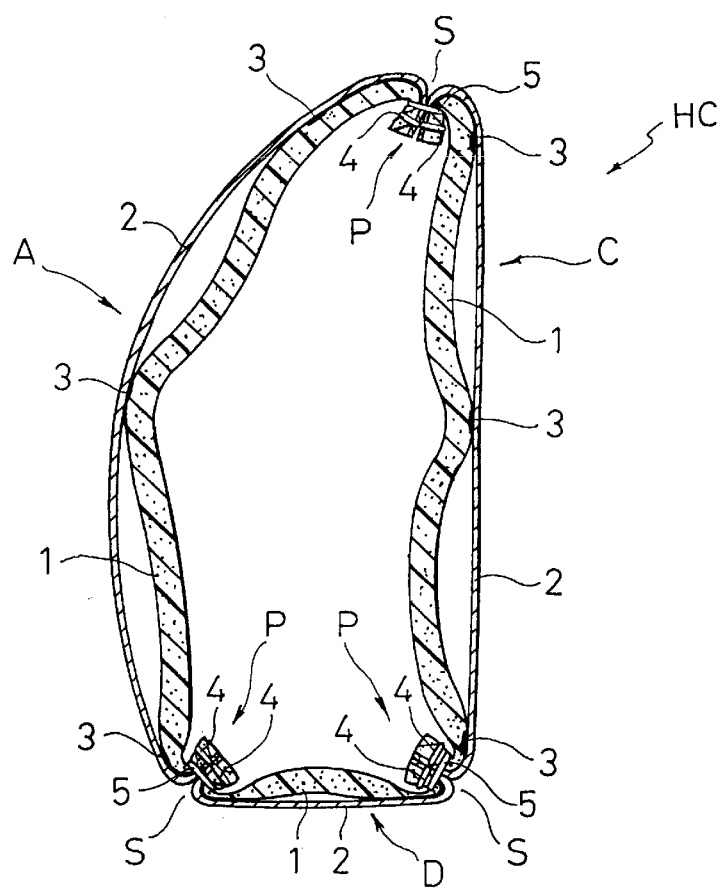
FIG. 6 is a sectional view taken along the line VI—VI in FIG. 4.
Figures 9, 10:
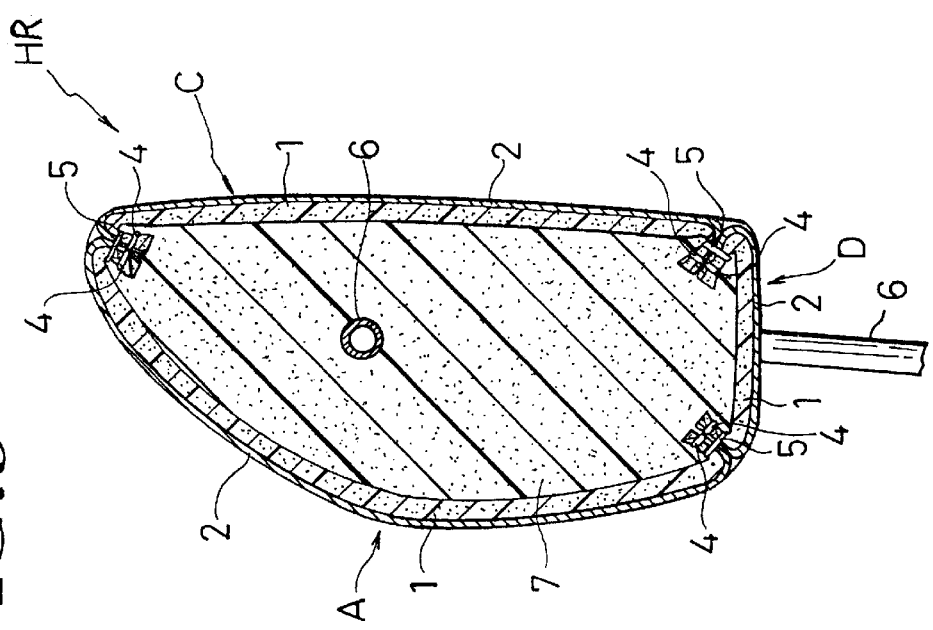
FIG. 9 is a sectional view taken along the line IX—IX in the FIG. 5.
FIG. 10 is a sectional view showing an example where an armrest is formed by the method of the present invention.

Consequently, as shown in FIGS. 5 and 9, there is produced a resulting headrest (HR) with a pair of stays (6) projecting therefrom. It is appreciated that the expanded mass of foam cushion member (7) causes a further uniform stretching of all the leather surface cover layers (2) on and over the foam padding layers (1), thereby positively avoiding creation of any slack and crease on the whole outer appearance of the headrest (HR).

FIG. 10 shows an example where an armrest (AM) can be formed by the method of the present invention. In this instance, though not clearly shown, a required number of preformed surface cover pieces (2) and foam padding pieces (1) are prepared as cover materials for providing six cover sections (for example at the designations (A) (C) (D) in FIG. 10) required to form an elongated exadedral body of trim cover assembly conforming to a resulting contour of armrest (AM), in contrast to the body of the above-described headrest (HR). Of course, as similar to all the processes for forming the headrest (HR) as above, each foam padding piece (1) is equal in size to each mating surface cover piece (2), and both of those pieces (1) (2) are temporarily bonded together at small localized points as in FIGS. 1 and 2. After they are sewn at their peripheral end portions as in FIG. 2, the sewn end portions are bent and sew with all the corresponding bent end portions of another cover sections so as to provide a three-dimensional trim cover assembly contoured to the outer shape of armrest (AM). After having placed an armrest frame (6') in the trim cover assembly, a foaming is effected, as similar to the case of headrest (HR) described earlier, to provide a resulting armrest (AM) as shown in FIG. 10.

It is noted again that the above descriptions are merely dedicated to exemplary modes of headrest and armrest, and that they are not limitative.

From the descriptions thus made, in accordance with the present invention, it is appreciated that such small temporarily bonded local points (at 3) effectively serve to not only retain the leather surface cover piece or layer (2) in a uniformly stretched state, but also insure uniform stretch of the foam padding layer (1) during all the assembly steps including the steps of forming the trim cover assembly (HC)

and the foaming steps to form a resultant foamed product, such as a headrest (HR) or an armrest (AM). In other words, due to such scattered temporarily bonded points, there is no restrained relation between the surface cover layer (2) and the foam padding layer (1) all through the assembly processes, which insures to allow free relative stretching movement between the two layers (2) (1) by removing the local bonded points at (3) after the foaming process, whereby any crease and slack is not caused in both of the layers (2) (1) in a resultant foamed product. Hence, the outer aesthetic appearance of the foamed product, such as the headrest (HR) and armrest (AM), is far improved.

Finally, it should be understood that the present invention is not limited to the illustrated embodiments, but any other modifications, replacements and additions may be structurally applied thereto without departing from the scopes of the appended claims.

What is claimed is:

1. Method for forming a foamed product integral with trim cover assembly, comprising the steps of:

forming a plurality of surface cover pieces in a predetermined shape, each having ends;

forming a plurality of foam padding pieces, each being generally equal in size to each of said plurality of surface cover pieces and having ends;

temporarily securing local points of each of said plurality of foam padding pieces to respective local points of each of said plurality of surface cover pieces via a securing means, thereby providing a temporarily secured cover section unit;

providing a plurality of said temporarily secured cover section units;

thereafter, sewing together end portions of said plurality of the temporarily secured cover section units, thereby forming said trim cover assembly in a three-dimensional shape;

injecting a liquid foaming material into inside of the thus-formed trim cover assembly;

curing and expanding said liquid foaming material so as to create a foam cushion member filled in the trim cover assembly; and thereafter, removing said local points of each of said plurality of the cover surface pieces from the respective said local points of said each of said plurality of the foam padding pieces by overcoming a securing strength of said securing means;

whereby the foamed product integral with the trim cover assembly is formed, in which both said plurality of surface cover pieces and said plurality of foam padding pieces are stretched uniformly.

2. The method as defined in claim 1, wherein said each of said plurality of cover surface pieces is a piece of natural or artificial leather material.

3. The method as defined in claim 1, wherein said local points are defined adjacent to and along the end portions of each of said plurality of surface cover pieces and said plurality of foam padding pieces.

4. The method as defined in claim 1, which further includes the step of sewing peripheral ends of said temporarily secured cover section unit at a line distant from said local points, prior to said step of providing said plurality of said temporarily secured cover section units.

5. The method as defined in claim 1, wherein said securing means is an adhesive agent.

6. The method as defined in claim 1, which includes the step of bending the end portions of said plurality of cover section units at substantially a right angle with predetermined bending lines in a direction to a side where said plurality of foam padding pieces lie, prior to said step of sewing together end portions of said plurality of the temporarily secured cover section units.

7. The method as defined in claim 1, wherein said foamed product with the trim cover assembly is a headrest or an armrest.

* * * * *